(12) United States Patent
Martin

(10) Patent No.: US 7,275,427 B1
(45) Date of Patent: Oct. 2, 2007

(54) DEVICE FOR MOUNTING ELECTRONIC MONITORING COMPONENTS TO A TIRE

(75) Inventor: Terry Martin, Duncan, SC (US)

(73) Assignee: Michelin Recherche et Technique S.A., Granges-Paccot (CH)

( * ) Notice: Subject to any disclaimer, the term of this patent is extended or adjusted under 35 U.S.C. 154(b) by 907 days.

(21) Appl. No.: 10/091,974

(22) Filed: Mar. 6, 2002

(51) Int. Cl.
G01M 17/02 (2006.01)

(52) U.S. Cl. ........................................ 73/146; 73/146.8

(58) Field of Classification Search ....... 73/146–146.8, 73/756; 152/152.1, 151
See application file for complete search history.

(56) References Cited

U.S. PATENT DOCUMENTS 5,200,756 A  4/1993 Feller
6,030,478 A * 2/2000 Koch et al. .............. 152/152.1
6,217,683 B1  4/2001 Balzer
6,443,198 B1 * 9/2002 Koch et al. .............. 152/152.1

FOREIGN PATENT DOCUMENTS

WO  WO 02/07993  1/2002

* cited by examiner

Primary Examiner—Edward Lefkowitz
Assistant Examiner—Jermaine Jenkins
(74) Attorney, Agent, or Firm—E. Martin Remick; Adam Arnold; Frank J. Campigotto

(57) ABSTRACT

A device for mounting electronic monitoring components to a tire includes a patch having a block mounted thereon and a mating monitoring package. The block includes opposing sides that mutually diverge to form a contour, for example, a dovetail profile, and the package includes a complementary channel for sliding onto the block.

7 Claims, 2 Drawing Sheets

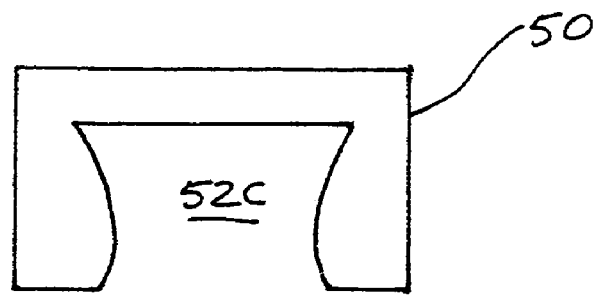
FIG. 4
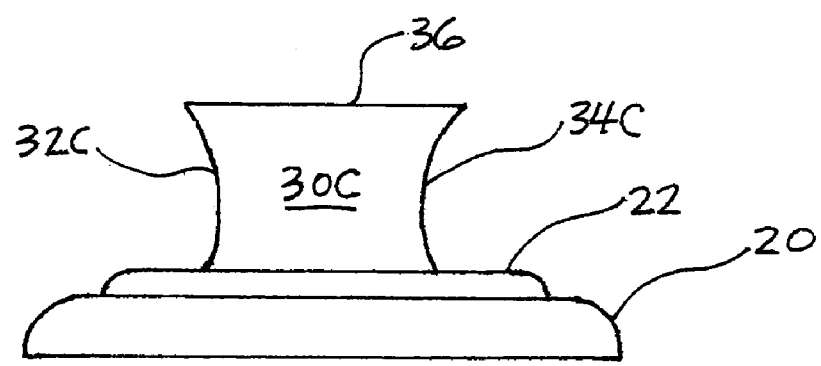
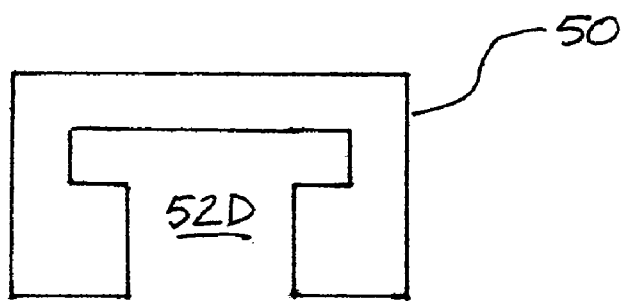
FIG. 5
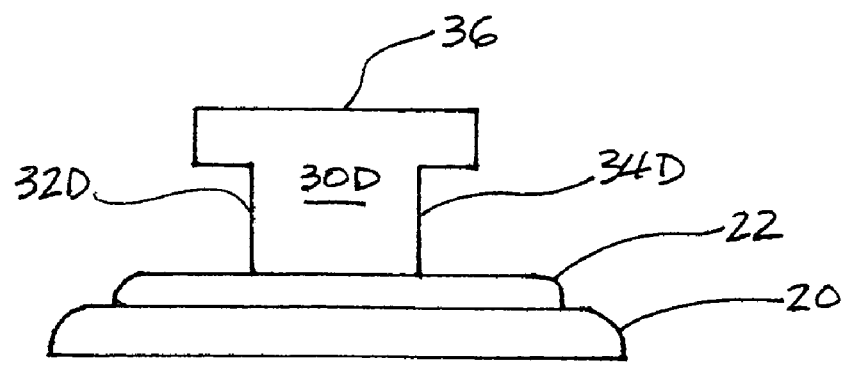

DEVICE FOR MOUNTING ELECTRONIC MONITORING COMPONENTS TO A TIRE

BACKGROUND AND SUMMARY OF THE INVENTION

The invention relates to a device for mounting electronic monitoring components to a surface of a tire. More specifically, the invention relates to a device for mounting a package containing electronic components securely to a tire.

With the growing interest recently in monitoring the operating conditions of tires, for example, pressure and temperature conditions, an interest in devices for mounting the monitoring devices to the tire has also arisen. A review of the art shows a variety of devices available. Few devices, however, allow for the ready dismounting of electronic equipment, which may be necessary to change a battery, or to remount the device on another tire, for example.

The invention relates to a mounting device for a monitoring package for vehicle tires and is suited especially for large off-road tires for haul vehicles such as earthmovers. The device in accordance with the invention permits ready mounting and dismounting of a monitoring package, which is advantageous for use in the field. The device securely holds the monitoring package in place under the rigorous conditions experienced by an off-road tire.

According to the invention, the device comprises a patch having a surface for bonding with a surface of the tire and a mounting block disposed on a second, opposite surface of the patch. The mounting block extends vertically from the plane of the second surface to provide a mounting position spaced from the patch, and therefore, spaced from the surface of the tire.

The mounting block includes two opposing sides that mutually diverge to provide an engaging contour for slidable mounting of a package on the block. The opposing sides may diverge from the second surface in a linear manner or a concave or convex arcuate manner. Alternatively, the opposing sides may diverge at a particular location, such as a T-shape or I-beam shape. A monitoring package is formed with a channel having a mating contour.

The block and monitoring package may include a detent to lock the block and monitoring package together.

BRIEF DESCRIPTION OF THE DRAWINGS

The invention will be better understood by reference to the following Detailed Description in conjunction with the appended drawings, in which:

FIG. 4 is end view of a third embodiment of a monitoring package and mounting block; and, FIG. 5 is an end view of yet another embodiment of a monitoring package and mounting block.

DETAILED DESCRIPTION

Figure 1:
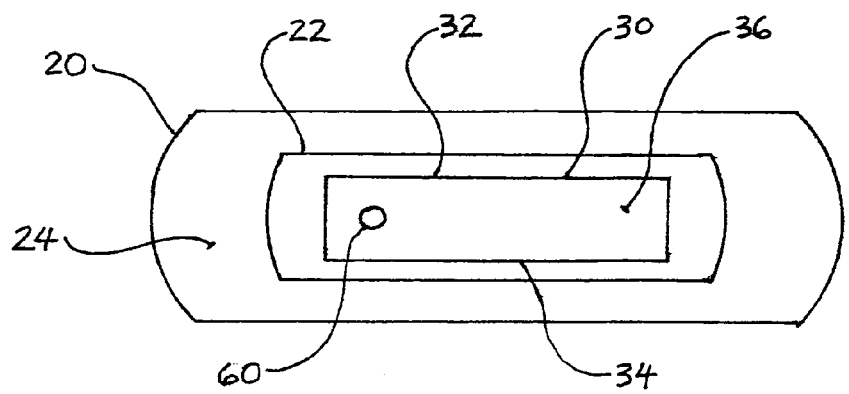
FIG. 1 is a top view of mounting patch and block in accordance with the invention.

The invention provides a mounting device for an electronic package that facilitates mounting and dismounting. As shown in the top view of FIG. 1, the device 10 includes a patch 20 formed of a layer of rubber material and having a first surface (opposite that shown) conditioned for bonding to an inner surface of a tire. Bonding may be done by adhesive or a rubber curing operation. A mounting pad 22 is formed on a second, opposite or upper surface 24 of the patch 20. A mounting block 30 is disposed on the mounting pad 22 and extends upward from the pad. The mounting pad 22 helps distribute stresses transmitted to the patch from the tire during the tire's rolling movement to prevent damage to the block 30.

The block 30 includes two, opposing sides 32, 34 and an upper side 36 that define a contour for engaging a package for tire monitoring electronics. A package for tire monitoring electronics as used here means a housing, container, box, or other structure for supporting and protecting electronic devices for sensing operating conditions in the tire, transmitting and receiving data from outside the tire, storing identification information or communication protocols, or any other similar electronic devices as may be used in relation with a tire. The invention is not intended to claim or be limited to any particular electronic device.

The arrangement of the opposing sides 32, 34 and the upper side 36 disposed between them allows the package to slide onto the block 30 in the direction of the opposing sides. Friction between the package and the mating sides 32, 34, 36 prevents the package from sliding off the block during rotation of the monitored tire. Alternatively, a mechanical fastener, such as a screw can be used to fasten the package to the block.

Alternatively, the package may be formed in parts that may be assembled around the block 30 to engage the sides 32, 34 for positive engagement. A fastener may be used to secure the package to the block.

As shown in FIGS. 2-5, the opposing sides 32, 34 of the block 30 are shaped or oriented so that movement of the package upwardly or vertically from the block is prevented. In accordance with the invention, the opposing sides 32, 34 mutually diverge to provide resistance to vertical movement.

Figures 2, 3:
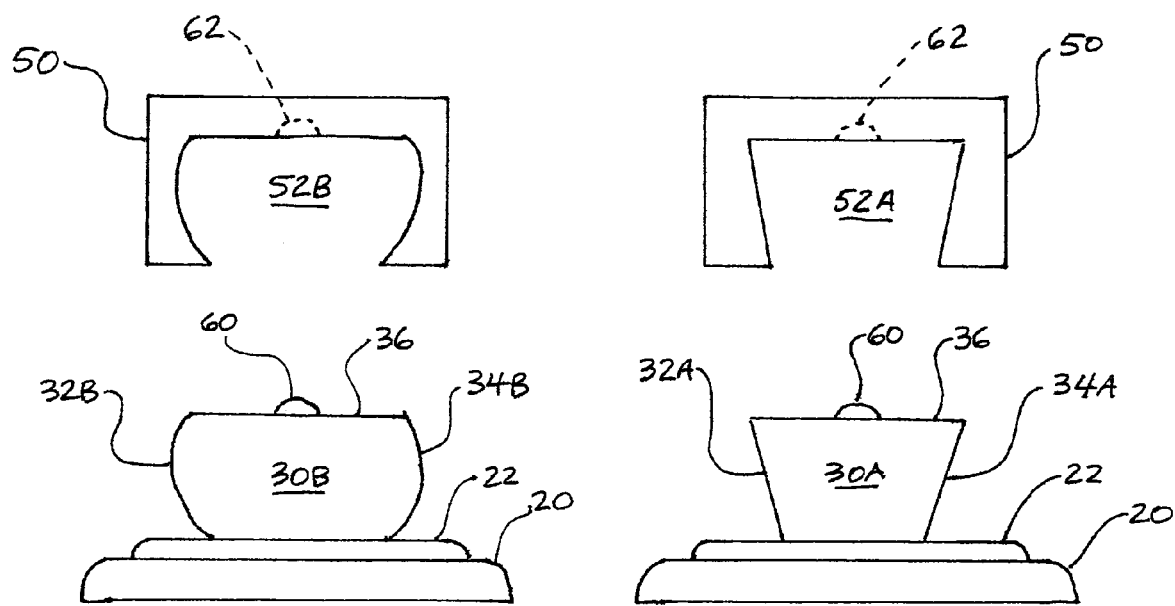
FIG. 2 is an end view of a first embodiment of the device, showing a monitoring package and a mating mounting block.
FIG. 3 is an end view of a second embodiment of a monitoring package and mounting block.

In FIG. 2, a mounting patch 20 with a first embodiment of the block 40 shows opposing sides 32A, 34A that extend linearly and divergently from the pad 22 to define a dovetail arrangement. A monitoring package 50 is formed with a mating channel or trough 52 having a complementary shape.

FIG. 3 illustrates a second embodiment, in which the opposing sides 32B, 34B are convex arcuate surfaces. The monitoring package 50 has a trough 52B with a cup-shaped profile to mate with the block.

FIG. 4 shows block 30C having arcuate, concave opposing sides 32C, 34C. The monitoring package 50 includes an hourglass-shaped trough to engage the block 30C of this embodiment.

FIG. 5 shows a block 30D with a T-shaped profile, in which the opposing sides 32D, 34D are parallel adjacent the pad 22 and diverge at 180° near the upper surface 36. The monitoring package 50 includes a trough 52D with a T-shaped profile.

The block 30 and package 50 may also have a device to secure the package from sliding movement to supplement the friction of the opposing sides 32, 34, illustrated in connection with FIGS. 1 and 2. A detent 60, for example, a button, may be formed on the upper surface 36 of the block 30 and a mating recess 62 formed in the package 50. The recess 62 receives the button 60 and provides additional force 3 against sliding to help secure the package on the block. Alternatively, a mechanical fastener, such as a screw, can be used to fasten the package 50 to the block.

The invention has been described and illustrated in terms of preferred embodiments; however, those skilled in the art will recognize that the principles disclosed here are applicable to other embodiments. The invention is not limited to what is literally described, but to the full scope of the appended claims.

What is claimed is:

1. A device for mounting a monitoring package on a tire surface, comprising:
   a planar patch having a first surface conditioned for bonding to an inner liner of a tire and second surface oppositely disposed;
   a block disposed on the second surface and upstanding therefrom, the block having two opposing outer sides which mutually diverge to define an engaging contour; and,
   a package for containing tire monitoring devices, the package having a channel with a complementary contour for slidable engagement with the engaging contour.

2. The device as claimed in claim 1, wherein the two opposing sides define a trapezoidal cross section.

3. The device as claimed in claim 1, wherein the two opposing sides are convex.

4. The device as claimed in claim 1, wherein the two opposing sides are concave.

5. The device as claimed in claim 1, wherein the two opposing sides define a T-shaped profile with an upper surface of the block.

6. The device as claimed in claim 1, further comprising detent means for engaging a monitoring package to prevent relative sliding movement.

7. A device for mounting a monitoring package on a tire surface, comprising:
   a planar patch having a first surface conditioned for bonding to an inner liner of a tire and second surface oppositely disposed;
   a block disposed on the second surface and upstanding therefrom, the block having two opposing upstanding outer sides which mutually diverge to define an engaging contour; and,
   a package for containing tire monitoring devices, the package having a channel with a complementary contour for slidable engagement with the engaging contour in a direction parallel to the planar patch, wherein the engaging contour prevents movement perpendicular to the planar patch.

* * * * *